UNITED STATES PATENT OFFICE 2,413,644

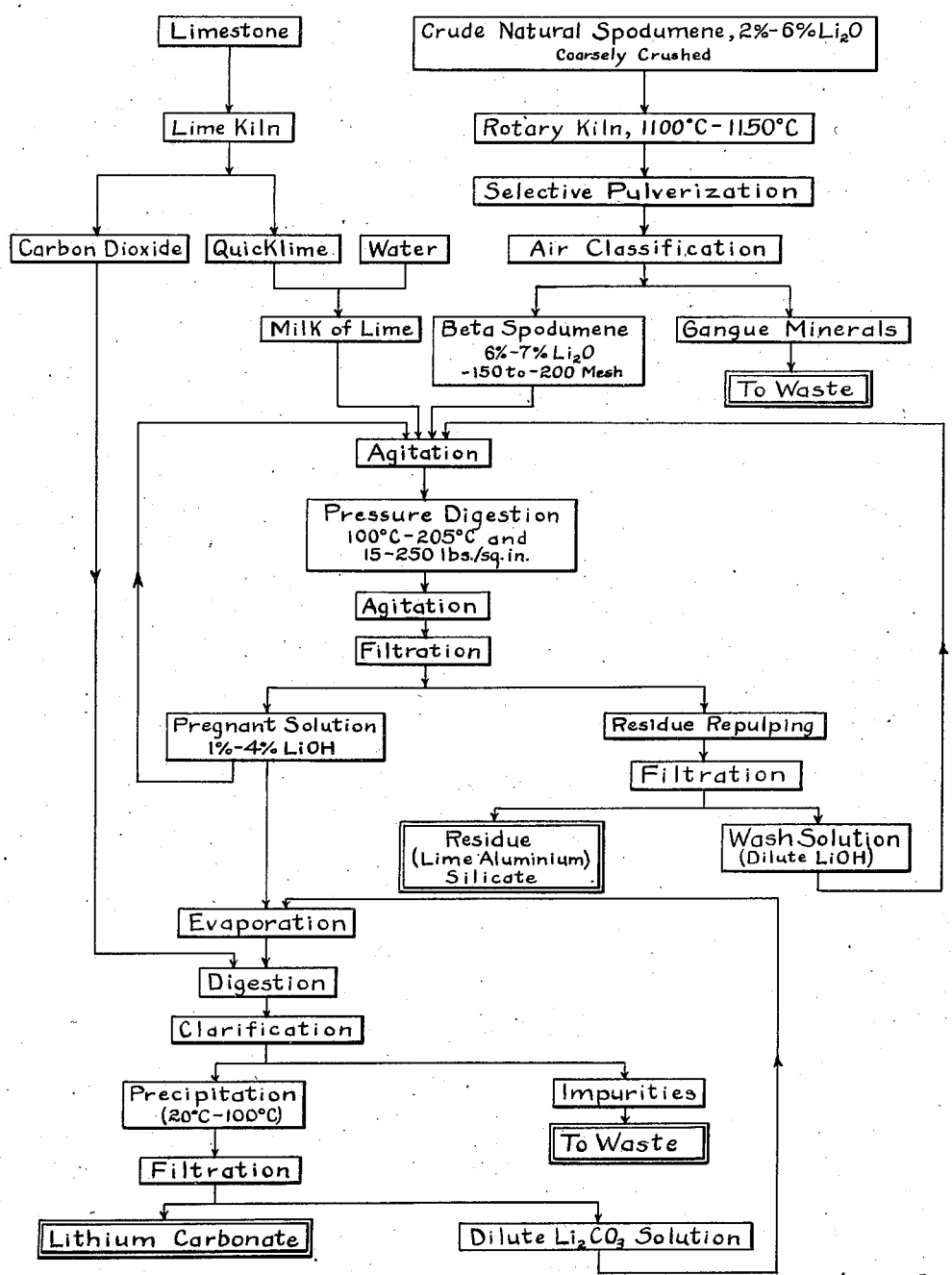

PRODUCTION OF LITHIUM COMPOUNDS

Clifford McIntosh Nicholson, Ottawa, Ontario, Canada, assignor to Nepheline Products Limited, Toronto, Ontario, Canada, a corporation of Canada Application February 27, 1943, Serial No. 477,403
In Canada February 18, 1943

11 Claims. (Cl. 23—30)

This invention relates to the production of lithium compounds and more particularly to the extraction of lithium from the mineral spodumene, which is a lithium aluminum silicate.

Spodumene is known to have two crystalline modifications. As found naturally, it exists as the alpha variety. When the natural mineral is heated to temperatures of 1050 to 1200° C. it changes or decrepitates to the beta variety, which is soft and pulverulent and does not revert to the alpha form when cooled. It is known that such heat treatment of the natural rock facilitates concentration and extraction of its lithia content.

While lithium minerals are plentiful, known methods of extracting the lithium therefrom are so expensive that lithium has not been readily available for many uses for which it is well adapted. Acid treatments have been most commonly used. Volatilization of the lithium as a chloride has been proposed.

The object of the present invention is to provide a more economical method for obtaining lithium compounds. More particularly the object is to so treat spodumene that the lithium may be extracted by leaching with water.

Applicant has found that when the beta variety of spodumene is leached with hot water in the presence of lime, high yields of lithium may be readily obtained. The invention thus contemplates a method of treating the mineral spodumene for the extraction of lithium by leaching with water.

The invention will be described with reference to two particular procedures in each of which beta spodumene is leached with water in the presence of lime.

Crude natural spodumene is heated in a rotary or other kiln at a temperature of say 1100–1150° C. to convert it to beta spondumene. The product is subjected to a mild agitating or crushing action to liberate the relatively soft beta spodumene from the gangue minerals and the mixture is classified by screening, air separation or the like. The lithium content of the beta spodumene thus prepared is higher than that of the natural mineral.

This material having a particle size of minus 150 to minus 200 mesh is then subjected to digestion with lime and water, preferably at a temperature of 100 to 205° C. with a corresponding pressure of substantially 15 to 250 pounds per square inch, to dissolve the lithium as lithium hydroxide. The mixture is filtered to remove the lime aluminum silicate residue which is washed with water, for example, by repulping and again filtering, as shown in the flow sheet the wash solution being returned to the digester for recovery of the lithium therein. Extractions in excess of 90% of the lithium have been obtained. The filtrate from the first filtration may be recirculated through the digester to increase its lithium content to facilitate the precipitation of the lithium therefrom.

For example, 100 parts beta spodumene and 193 parts of slaked lime were mixed with 500 parts by weight of water and digested with mild agitation for two hours at 194–204° C. The pulp was filtered and washed. The filtrate contained 84% of the lithia of the spodumene and was practically free from silica and alumina.

A lime kiln may be provided for the production of quicklime for the digestion and carbon dioxide for the precipitation of the lithium as lithium carbonate. The lime may be hydrated before admission to the digester or the quicklime, beta spodumene and water may be charged directly to the digester in order to utilize the heat of hydration of the lime in the digestion.

The filtrate containing the lithium hydroxide is then treated with carbon dioxide to precipitate substantially pure lithium carbonate which is filtered from the solution and the latter is recirculated for further recovery of lithium. The solution of lithium hydroxide may be concentrated by evaporation before carbonation. Solutions containing about 2% of lithium hydroxide are best treated with carbon dioxide at a temperature of about 60° C. More concentrated solutions containing say 4% of lithium hydroxide may be precipitated at room temperature.

The reactions are as follows:

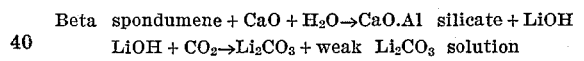

Beta spondumene + $CaO + H_2O \rightarrow CaO.Al$ silicate + $LiOH$ $LiOH + CO_2 \rightarrow Li_2CO_3$ + weak $Li_2CO_3$ solution It will be apparent that the lithium may be precipitated from the lithium hydroxide solution as other than the carbonate. For example a soluble fluoride such as acid potassium fluoride will precipitate lithium fluoride. Other reagents may be used instead of carbon dioxide to remove impurities such as lime and alumina from the lithium hydroxide solution.

The accompanying drawing shows an illustrative flow sheet of the above procedure.

It will be apparent that the crude natural spodumene may be subjected to flotation or the like to provide a concentrate to be treated as just described. In such case however the classification following the heat treatment may not be required.

It will also be observed that when treating weak solutions of lithium hydroxide the initial carbonation precipitates impurities before the lithium carbonate is precipitated. It has been found that by properly controlling the concentration of the lithium hydroxide solution impurities such as lime and alumina are removed from the pressure filtrates by carbonation. After removal of these impurities and concentration of the purified solution by evaporation, further carbonation and digestion precipitated lithium carbonate which assayed 97.8% $Li_2CO_3$.

Alternately intimate mixtures of finely ground natural alpha spodumene and limestone may be sintered at a temperature of 1000 to 1230° C. to provide a product for direct leaching with hot water. The mixture should contain at least about 2 parts of limestone per part of spodumene. 2.7 parts of limestone per part of spodumene gave good results. The extraction of lithia was found to increase with the higher proportions of limestone and with the lower temperature. The actual proportion of limestone may be governed by the subsequent use of the residue.

For example, 250 parts of alpha spodumene ground to about 200 mesh were intimately mixed with 677.5 parts by weight of limestone and the mixture sintered in a muffle furnace at 1120° C. The sintered product was relatively soft and was pulverized to pass a 100-mesh screen. It was then treated with water at 100° C. and about 80% of the lithia was extracted.

The results of such treatment indicate that while the sintering temperature should be high enough to convert the alpha spodumene to the beta variety and drive off all the carbon dioxide from the limestone, it should not be high enough to cause the calcium oxide formed to combine completely with the alumina and silica of the spodumene. The presence of the hydrated calcium oxide appears to facilitate the extraction of the lithia as lithium hydroxide.

The residue from the limestone spodumene sinter constitutes a valuable by-product from which alumina may be recovered with or without modification by known methods, or which may be used directly with or without modification for producing Portland cement clinker.

The term "beta spodumene" as used herein and in the appended claims means natural or alpha spodumene which has been heated to 1050 to 1200° C. and converted to a soft pulverulent form which is stable and does not revert to alpha spodumene when cooled.

I claim:

1. A method producing a lithium compound which comprises digesting beta spodumene with lime and water at a temperature of 100 to 205° C. and recovering a solution of lithium hydroxide.

2. A method of producing a lithium salt which comprises digesting beta spodumene with lime and water at a temperature of 100 to 205° C. to form a solution of lithium hydroxide and precipitating the lithium from the solution as a salt at least relatively insoluble in water.

3. A method as defined in claim 2 wherein the solution of lithium hydroxide is treated with carbon dioxide to precipitate lithium carbonate.

4. A method as defined in claim 2 wherein the lithium hydroxide solution is recirculated through the digester to increase the lithium concentration of the solution.

5. A method of producing lithium hydroxide which comprises sintering natural spodumene to form beta spodumene and digesting the finely divided beta spodumene with lime and water at a temperature of 100 to 205° C. to form a solution of lithium hydroxide.

6. A method as defined in claim 5 wherein the sintered spodumene is selectively pulverized and the gangue minerals are removed therefrom to provide a concentrate for digesting with water and lime.

7. A method of producing lithium hydroxide which comprises sintering spodumene with limestone at a temperature of 1000 to 1230° C. and digesting the sinter with water at a temperature of 100 to 205° C. to form a solution of lithium hydroxide.

8. A method as defined in claim 7 wherein 2 to 2.7 parts of limestone per part of spodumene constitutes the mass to be sintered.

9. A method as defined in claim 7 wherein the solution of lithium hydroxide is recirculated through the digestion chamber to increase its concentration.

10. A method as defined in claim 1 wherein the beta spodumene is formed by sintering at a temperature of 1000 to 1230° C. one part of alpha spodumene with at least substantially two parts of limestone to provide beta spodumene and free lime.

11. A method of producing lithium hydroxide, which comprises forming a mixture selected from the group of mixtures consisting of: (1) beta spodumene obtained by heating alpha spodumene without additants thereto, lime and water; and (2) alpha spodumene heated with lime to a sintering temperature and water, and heating said mixture until the solids are digested and the lithium hydroxide is formed.

CLIFFORD McINTOSH NICHOLSON.